US012116877B2

(12) United States Patent
Wang et al.

(10) Patent No.: US 12,116,877 B2
(45) Date of Patent: Oct. 15, 2024

(54) METHODS AND APPARATUS FOR OFFSHORE POWER GENERATION AND AMMONIA PRODUCTION

(71) Applicant: ExxonMobil Technology and Engineering Company, Spring, TX (US)

(72) Inventors: Rui Wang, Millbrae, CA (US); Mark Christian Ausborn, Houston, TX (US); Zhen Li, Houston, TX (US); Elliot M. Chang-Tung, Houston, TX (US)

(73) Assignee: ExxonMobil Technology and Engineering Company, Spring, TX (US)

( * ) Notice: Subject to any disclaimer, the term of this patent is extended or adjusted under 35 U.S.C. 154(b) by 81 days.

(21) Appl. No.: 17/594,220

(22) PCT Filed: Jul. 1, 2021

(86) PCT No.: PCT/US2021/040052
§ 371 (c)(1),
(2) Date: Oct. 7, 2021

(87) PCT Pub. No.: WO2022/015516
PCT Pub. Date: Jan. 20, 2022

(65) Prior Publication Data
US 2023/0340868 A1    Oct. 26, 2023

Related U.S. Application Data

(60) Provisional application No. 63/051,678, filed on Jul. 14, 2020.

(51) Int. Cl.
*E21B 43/40* (2006.01)
*B01D 53/26* (2006.01)
(Continued)

(52) U.S. Cl.
CPC ............ *E21B 43/40* (2013.01); *B01D 53/265* (2013.01); *B01J 19/245* (2013.01); *C01B 3/025* (2013.01);
(Continued)

(58) Field of Classification Search
CPC ............ B01D 2256/10; B01D 2256/16; B01D 2256/22; B01D 2256/24; B01D 2257/102;
(Continued)

(56) References Cited

U.S. PATENT DOCUMENTS 4,988,490 A * 1/1991 Nicholas .............. B01D 53/047
423/652
7,810,565 B2 * 10/2010 Zubrin .................. E21B 43/168
166/305.1
(Continued)

FOREIGN PATENT DOCUMENTS

DE     102017222948 A1 *  1/2019

OTHER PUBLICATIONS

Schmitt et al. DE102017222948A1 English Translation (Year: 2019).*
(Continued)

*Primary Examiner* — Samir Shah
*Assistant Examiner* — Jordan W Taylor
(74) *Attorney, Agent, or Firm* — ExxonMobil Technology and Engineering Company—Law Department (57) ABSTRACT

Offshore systems and methods may be configured for oil production, offshore power generation, ammonia production, and carbon dioxide injection for EOR. For example, a method performed on an offshore facility may include: separating a produced hydrocarbon into a produced gas and a produced oil; combusting the produced gas to produce power and a flue gas; at least partially removing nitrogen from the flue gas to produce a carbon dioxide-enriched flue gas and a nitrogen-enriched flue gas; reforming a portion of
(Continued)

the produced gas to produce a stream including hydrogen and carbon dioxide; at least partially separating the carbon dioxide from the stream to yield a carbon dioxide stream and a hydrogen stream; reacting the hydrogen stream and the nitrogen-enriched flue gas to yield ammonia; combining and compressing the carbon dioxide stream and the carbon dioxide-enriched flue gas; and injecting the compressed gas from the gas compressor into the gas reservoir.

18 Claims, 2 Drawing Sheets

(51) Int. Cl.
| | |
|---|---|
| *B01J 19/24* | (2006.01) |
| *C01B 3/02* | (2006.01) |
| *C01B 3/48* | (2006.01) |
| *C01C 1/04* | (2006.01) |
| *C09K 8/594* | (2006.01) |
| *E21B 43/16* | (2006.01) |
| *F02C 6/00* | (2006.01) |

(52) U.S. Cl.
CPC .............. *C01B 3/48* (2013.01); *C01C 1/0417* (2013.01); *C01C 1/0447* (2013.01); *C09K 8/594* (2013.01); *E21B 43/164* (2013.01); *F02C 6/00* (2013.01); *B01D 2257/80* (2013.01); *B01D 2258/0283* (2013.01); *C01B 2203/0233* (2013.01); *C01B 2203/0283* (2013.01); *C01B 2203/0475* (2013.01); *C01B 2203/068* (2013.01); *C01B 2203/1241* (2013.01); *C01B 2203/84* (2013.01)

(58) Field of Classification Search
CPC ........ B01D 2257/504; B01D 2257/702; B01D 2257/80; B01D 2258/0283; B01D 53/002; B01D 53/22; B01D 53/265; B01D 53/75; B01J 19/245; B63B 2035/448; C01B 2203/0233; C01B 2203/0283; C01B 2203/0405; C01B 2203/0445; C01B 2203/0475; C01B 2203/068; C01B 2203/1241; C01B 2203/84; C01B 2203/86; C01B 3/025; C01B 3/38; C01B 3/48; C01B 3/50; C01C 1/0405; C01C 1/0417; C01C 1/0447; C09K 8/594; E21B 43/164; E21B 43/40; F02C 6/00; F05D 2220/75; Y02C 20/40; Y02E 20/16; Y02P 20/151; Y02P 20/52; Y02P 30/00
See application file for complete search history.

(56) References Cited

U.S. PATENT DOCUMENTS

2018/0036670 A1* 2/2018 Sundaram .......... B01D 53/0407
2019/0368326 A1* 12/2019 Drescher ............... E21B 43/164

OTHER PUBLICATIONS

Roussanaly et al., "Offshore Power Generation with Carbon Capture and Storage to Decarbonise Mainland Electricity and Offshore Oil and Gas Installations: A Techno-economic Analysis", Applied Energy, 2019, vol. 233-234, pp. 478-494.

Roussanaly et al., "Clean Electricity Production from Offshore Natural Gas", GHGT-14, https://az659834.vo.msecnd.net/eventsairwesteuprod/production-ieaghg-public/2a8cc6c4a64b4c949cc2e83b2cb7f264.

Roussanaly et al., "Clean Electricity Production from Offshore Natural Gas", https://blog.sintef.com/sintefenergy/gas-technology/clean-electricity-production-from-offshore-natural-gas/.

* cited by examiner

METHODS AND APPARATUS FOR OFFSHORE POWER GENERATION AND AMMONIA PRODUCTION

CROSS REFERENCE TO RELATED APPLICATION

This application is a National Phase Application of PCT Application No. PCT/US2021/040052, filed Jul. 1, 2021, which claims the benefit of U.S. Provisional Application No. 63/051,678, filed Jul. 14, 2020, the disclosures of which are incorporated herein by reference in their entireties.

FIELD OF THE INVENTION

The present disclosure relates to systems and methods for oil production, offshore power generation, ammonia production, and carbon dioxide injection for enhanced oil recovery (EOR).

BACKGROUND OF THE INVENTION

Offshore oil and gas production that involves extracting oil and gas from beneath the sea is a critical element of the world's energy supply. Offshore oil and gas production requires the use of increasingly sophisticated technology and ever greater attention to the related environmental impacts. As numerous oil producing countries are experiencing substantial domestic growth in power demand, significant interest in enhanced oil recovery (EOR) to improve oil recovery from their reservoirs has been undertaken. Typically, EOR techniques include, for example, $CO_2$ injection for miscible flooding. The global concern over greenhouse gas emissions in combination with the implementation of cap-and-trade policies in many countries has set reducing $CO_2$ emissions a priority for these and other countries, as well as the companies that operate hydrocarbon production systems therein.

Some approaches to lower $CO_2$ emissions include fuel de-carbonization or post-combustion capture. However, both of these solutions are expensive and reduce power generation efficiency, resulting in lower power production, increased fuel demand, and increased cost of electricity to meet domestic power demand. Another approach is an oxyfuel gas turbine in a combined cycle (e.g., where exhaust heat from the gas turbine Brayton cycle is captured to make steam and produce additional power in a Rankin cycle). However, there are no commercially available gas turbines that can operate in such a cycle. Further, the power required to produce high purity oxygen significantly reduces the overall efficiency of the process. Hence, there is still a substantial need for a low to zero emission, high-efficiency hydrocarbon recovery process.

Furthermore, as the global demand for hydrocarbon energy continues to drive production, particularly among new assets in offshore reservoirs, still remain unprecedented challenges related to gas transportation and the logistic to achieve in a cost-efficient way the storage and distribution of gas, especially at a wide range of gas volume that needs appropriate adjustment for gas handling. For example, when the gas volume falls between 50 and 500 million standard cubic feet per day (MMSCFD), which are typical offshore associated gas volumes, there is no economically feasible solution available in the industry. In that case, the gas volume is found to be too small to compensate for the capital expenditure investment of a linear liquefied gas fleet and terminal, yet it is found to be too large for gas to liquid and gas transmission system type of transportation.

SUMMARY OF THE INVENTION

The present disclosure relates to systems and methods for oil production, offshore power generation, ammonia production, and carbon dioxide injection for EOR.

Disclosed herein are methods that comprise: providing an offshore facility comprising a gas turbine, a first gas separator, a reformer, a second gas separator, and an ammonia reactor; producing a produced hydrocarbon from a gas reservoir to the offshore facility; separating the produced hydrocarbon to yield a produced gas and a produced oil; combusting the produced gas in a gas turbine to produce power and a flue gas; at least partially removing nitrogen from the flue gas in the first gas separator to produce a carbon dioxide-enriched flue gas and a nitrogen-enriched flue gas; reforming a portion of the produced gas in the reformer to produce a stream comprising hydrogen and carbon dioxide; at least partially separating the carbon dioxide in the second gas separator from the stream to yield a carbon dioxide stream and a hydrogen stream; reacting the hydrogen stream and the nitrogen-enriched flue gas in the ammonia reactor to yield ammonia; combining and compressing the carbon dioxide stream and the carbon dioxide-enriched flue gas in a gas compressor to produce a compressed gas; and injecting the compressed gas from the gas compressor into the gas reservoir, wherein 80 mol % or more of hydrocarbon in the produced gas is combusted, reformed, and/or injected into the gas reservoir.

Disclosed herein are offshore facilities that comprise: an offshore production unit configured for producing a produced hydrocarbon from a reservoir; an oil and gas separator to receive the produced hydrocarbon for separating the produced hydrocarbon into a produced gas and a produced oil; a gas turbine configured to receive the produced gas for producing power and a flue gas; a first gas separator configured to receive the flue gas for at least partially removing nitrogen from the flue gas and for producing a carbon dioxide-enriched flue gas and a nitrogen-enriched flue gas; a reformer configured to receive a portion of the produced gas from upstream of the gas turbine for producing a stream comprising carbon dioxide and hydrogen; a second gas separator configured to receive the stream for at least partially removing carbon dioxide from the stream and for producing a carbon dioxide stream and a hydrogen stream; an ammonia reactor configured to receive the hydrogen stream and the nitrogen-enriched flue gas for producing ammonia; a gas compressor configured to receive the carbon dioxide-enriched flue gas and the carbon dioxide stream for producing a compressed gas; and an injection unit configured for injecting the compressed gas from the gas compressor into the gas reservoir.

BRIEF DESCRIPTION OF THE DRAWINGS

The following figures are included to illustrate certain aspects of the present disclosure and should not be viewed as exclusive embodiments. The subject matter disclosed is capable of considerable modifications, alterations, combinations, and equivalents in form and function, as will occur to one having ordinary skill in the art and having the benefit of this disclosure.

DETAILED DESCRIPTION OF THE INVENTION

The present disclosure relates to systems and methods for oil production, offshore power generation, ammonia production, and carbon dioxide injection for EOR. Advantageously, the systems and methods described herein include offshore facilities that produce oil, ammonia, and power as the primary or only product exports. In one example, said power may be transported onshore. Additionally or alternatively, the power may be transported to nearby offshore facilities that may be tapping the same reservoir, where these nearby offshore facilities use the power, at least in part, to produce oil and/or gas. Having power readily available may allow for placing production and transportation facilities further from shore and tap resources that are not currently economically viable.

Generally, the methods and systems described herein relate to offshore facilities that produce oil and gas, convert the gas produced from a reservoir (produced gas) into power via combustion with $CO_2$ being a byproduct that can be injected back into the reservoir for EOR. Further, the gas is used to produce ammonia on the offshore facility, which is a higher value commodity.

The power produced on the offshore facilities of the present disclosure can be (a) consumed locally on the offshore facility for additional gas production, (b) exported to nearby, offshore facilities producing gas and/or other hydrocarbons, or (c) exported to onshore markets. Alternately, the markets can be placed offshore. Offshore facilities have limited space and often require significant amounts of power to operate. The power-generating offshore facilities and related methods of the present disclosure advantageously allow for reducing the space requirements for power-generating equipment on other offshore, exploration and production facilities. This allows for including other equipment on such facilities that may be valuable in the exploration and production of hydrocarbons.

Further, power-generating offshore facilities and related methods of the present disclosure advantageously produce $CO_2$ on-site. Said $CO_2$ can be used EOR of the reservoir, which increases the production of the nearby offshore, exploration and production facilities while also reducing costs related to transporting EOR materials like $CO_2$ from onshore sites to the offshore site.

Additionally, power-generating offshore facilities and related methods of the present disclosure include ammonia production capabilities. Ammonia is mainly produced through the Haber-Bosch process using fossil fuels like natural gas and coal. Natural gas based ammonia production can release about 2.7 metric tons of carbon dioxide for every ton of ammonia produced. Natural gas can be converted into gaseous hydrogen via a series of processes (e.g., sulfur removal from the feedstock to form a sulfur-free feedstock; catalytic steam reforming of the sulfur-free feedstock to form hydrogen and carbon monoxide; catalytic shift conversion to convert the carbon monoxide to carbon dioxide and more hydrogen; catalytic methanation to remove any small residual amounts of carbon monoxide or carbon dioxide from the hydrogen). The produced gaseous hydrogen can be used for the ammonia production. Herein, methods of the present disclosure provide a solution for the ammonia production where a portion of the produced gas from the reservoir is used as a feedstock gas for the ammonia production. The combustion in the gas turbine uses air, so the flue gas therefrom includes a significant amount of nitrogen. In the methods and systems described herein, nitrogen is removed from the flue gas so that the injection fluid has a higher $CO_2$ concentration. Further, the ammonia production yields carbon dioxide, which can be directed back into the main process or system for compression and injection into the reservoir.

The new notation for the Periodic Table Groups is used as described in Chemical and Engineering News, 63(5), 27 (1985).

The following abbreviations are used herein: EOR is enhanced oil recovery; mol % is mole percent; BTU is British thermal unit; and MMSCFD is million standard cubic feet per day.

All numerical values within the detailed description and the claims herein are modified by "about" or "approximately" with respect to the indicated value, and take into account experimental error and variations that would be expected by a person having ordinary skill in the art. Unless otherwise indicated, ambient temperature (room temperature) is from about 18° C. to about 20° C.

As used in the present disclosure and claims, the singular forms "a," "an," and "the" include plural forms unless the context clearly dictates otherwise.

The term "and/or" as used in a phrase such as "A and/or B" herein is intended to include "A and B," "A or B," "A," and "B."

Where the term "between" is used herein to refer to ranges, the term encompasses the endpoints of the range. That is, "between 2% and 10%" refers to 2%, 10% and all percentages between those terms.

As used herein, the term "offshore" relates to a device, structure, or installation located on, within, or at the bottom (subsea) of water.

The term "hydrocarbon" refers to a class of compounds having hydrogen bound to carbon, and encompasses (i) saturated hydrocarbon compounds, (ii) unsaturated hydrocarbon compounds, and (iii) mixtures of hydrocarbon compounds (saturated and/or unsaturated), including mixtures of hydrocarbon compounds having different numbers of carbon atoms. The term "$C_n$," refers to hydrocarbon(s) or a hydrocarbyl group having n carbon atom(s) per molecule or group, wherein n is a positive integer. Such hydrocarbon compounds may be one or more of linear, branched, cyclic, acyclic, saturated, unsaturated, aliphatic, or aromatic, with optional substitution being present in some cases.

The term "$C_n$," group or compound refers to a group or a compound comprising carbon atoms at a total number of n. Thus, a "$C_m$-$C_n$" group or compound refers to a group or compound comprising carbon atoms at a total number thereof in the range from m to n. Thus, a $C_1$-$C_{50}$alkyl group refers to an alkyl group comprising carbon atoms at a total number thereof in the range from 1 to 50.

The terms "hydrocarbyl" and "hydrocarbyl group" are used interchangeably herein. The term "hydrocarbyl group" refers to any $C_1$-$C_{100}$ hydrocarbon group bearing at least one unfilled valence position when removed from a parent compound. Suitable "hydrocarbyl" and "hydrocarbyl groups" may be optionally substituted.

The term "alkyl" refers to a hydrocarbyl group having no unsaturated carbon-carbon bonds, and which may be optionally substituted.

The term "aryl" is equivalent to the term "aromatic" as defined herein. The term "aryl" refers to both aromatic compounds and heteroaromatic compounds, which may be optionally substituted. Both mononuclear and polynuclear aromatic compounds are encompassed by these terms.

The term "substituted" refers to replacement of at least one hydrogen atom or carbon atom of a hydrocarbon or hydrocarbyl group with a heteroatom or heteroatom functional group. Heteroatoms may include, but are not limited to, B, O, N, S, P, F, Cl, Br, I, Si, Pb, Ge, Sn, As, Sb, Se, and Te. Heteroatom functional groups that may be present in substituted hydrocarbons or hydrocarbyl groups include, but are not limited to, functional groups such as O, S, S=O, $S(=O)_2$, $NO_2$, F, Cl, Br, I, $NR_2$, OR, SeR, TeR, $PR_2$, $AsR_2$, $SbR_2$, SR, $BR_2$, $SiR_3$, $GeR_3$, $SnR_3$, $PbR_3$, where R is a hydrocarbyl group or H. Suitable hydrocarbyl R groups may include alkyl, alkenyl, alkynyl, aryl, heteroaryl, cycloalkyl, heterocyclyl, and the like, any of which may be optionally substituted.

The term "optionally substituted" means that a hydrocarbon or hydrocarbyl group may be unsubstituted or substituted. Unless otherwise specified, any of the hydrocarbyl groups herein may be optionally substituted.

As used herein, the term "reservoir" refers to a subsurface body of rock having sufficient porosity and permeability to store and transmit fluids.

As used herein, a "gas turbine" refers to a combustion engine that can convert natural gas or other fluid fuels to mechanical energy. This energy then drives a generator that produces electrical energy.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the present disclosure embodiments disclosed herein are presented herein. Not all features of a physical implementation are described or shown in this application for the sake of clarity. It is understood that in the development of a physical embodiment incorporating the embodiments of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" or "having" various components or steps, the compositions and methods can also "consist essentially of" or "consist of" the various components and steps.

As discussed above, the present disclosure relates to systems and methods for offshore power generation, ammonia production, and $CO_2$ injection for EOR.

Figure 1:
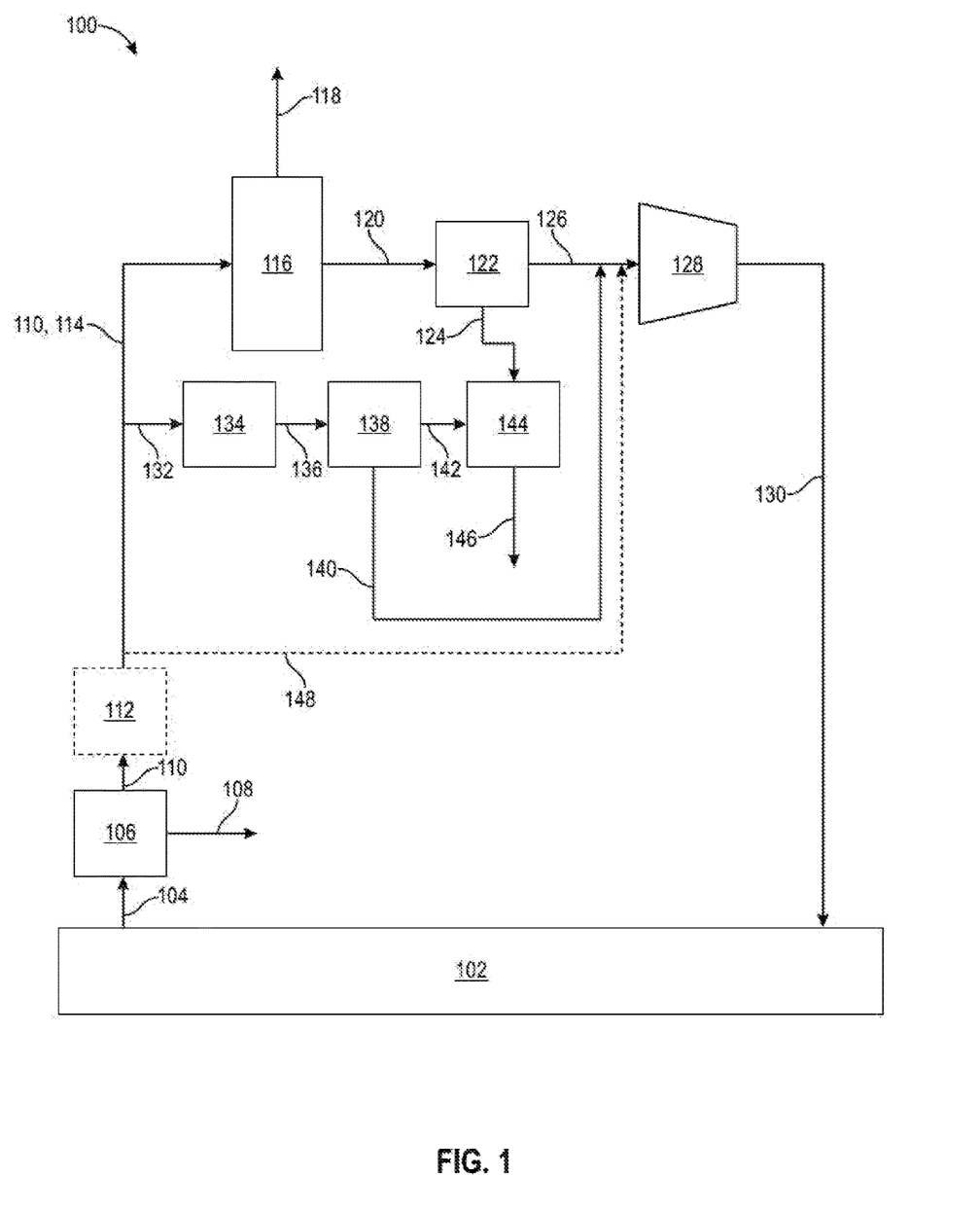
FIG. 1 is another non-limiting example flow diagram of a method for power generation, ammonia production, and $CO_2$ injection of the present disclosure.

FIG. 1 is a non-limiting example flow diagram of a method 100 for power generation, ammonia production, and $CO_2$ injection of the present disclosure. Generally, the methods according to the present disclosure may comprise: producing a hydrocarbon 104 from a reservoir 102; separating the produced hydrocarbon 104 to yield a produced oil 108 and a produced gas 110; separating combusting the produced gas 110 in a gas turbine 116 to produce power 118 and a flue gas 120; at least partially removing nitrogen from the flue gas 120 in a first gas separator 122 to produce a carbon dioxide-enriched flue gas 126 and a nitrogen-enriched flue gas 124; reforming a portion 132 of the produced gas 110 in a reformer 134 to yield a stream 136; separating the stream 136 in a second gas separator 138 to yield a carbon dioxide stream 140 and a hydrogen stream 142; reacting the hydrogen stream 142 with the nitrogen-enriched flue gas 124 in an ammonia reactor 144 to yield ammonia 146; combining and compressing the carbon dioxide-enriched flue gas 126 and the carbon dioxide stream 140 in a gas compressor 128 to produce a compressed gas 130; and injecting the compressed gas 130 into the reservoir 102.

More specifically, the produced hydrocarbon 104 from a reservoir 102 is separated into the produced gas 110 and the produced oil 108 in an oil and gas separator 106. The produced oil 108 may be exported, for example, via tanker (or other vessel) and/or pipeline.

The produced gas 110 may comprise: water (e.g., as steam), hydrogen, helium, nitrogen, carbon monoxide, carbon dioxide, hydrogen sulfide, gas hydrocarbons (e.g., methane, ethane, propane, butane), liquid hydrocarbons (e.g., pentane and heavier hydrocarbons, such as $C_8$ hydrocarbons), metal-containing compounds (e.g., mercury), and the like, and any combination thereof.

The produced gas 110 may have a hydrocarbon content of about 50 mol % to about 100 mol % (or about 50 mol % to about 75 mol %, or about 60 mol % to about 90 mol %, or about 85 mol % to about 100 mol %) based on the total moles of the produced gas 110, where about 90 mol % or greater (or about 90 mol % to about 100 mol %, or about 95 mol % to about 100 mol %) of the hydrocarbons in the produced gas 110 are a $C_1$-$C_4$ hydrocarbons.

The produced gas 110 may have a helium content of 0 mol % to about 20 mol % (or about 0.05 mol % to about 17.5 mol %, or about 0.1 mol % to about 15 mol %, or about 0.5 mol % to about 12.5 mol %, or about 1.5 mol % to about 10 mol %, or about 2 mol % to about 7.5 mol %, or about 2.5 mol % to about 5 mol %), based on the total mole percent of the produced gas 110.

The produced gas 110 may have a nitrogen content of about 0.01 mol % to about 50 mol % (or about 0.03 mol % to about 45 mol %, or about 0.05 mol % to about 40 mol %, or about 0.1 mol % to about 35 mol %, or about 0.15 mol % to about 30 mol %), based on the total mole percent of the produced gas 110.

The produced gas 110 may have a carbon dioxide content of about 50 mol % or less (or 0 mol % to about 50 mol %, or 0 mol % to about 5 mol %, or about 0.5 mol % to about 10 mol %, or about 5 mol % to about 25 mol %, or about 20 mol % to about 50 mol %, or about 30 mol % to about 50 mol %), based on the total mole percent of the produced gas 110.

The produced gas 110 may have a hydrogen sulfide content of 0 mol % to about 30 mol % (or about 0.01 mol % to about 25 mol %, or about 0.05 mol % to about 20 mol %, or about 0.1 mol % to about 15 mol %), based on the total mole percent of the produced gas 110.

Components in produced gas 110 like carbon dioxide and nitrogen can reduce the BTU of the produced gas 110. Furthermore, hydrogen sulfide and/or metal-containing compounds (e.g., mercury) can be poisonous to catalysts in downstream steps. Therefore, the methods and systems of the present disclosure may further include removing one or more components from the produced gas 110 using one or more purification units 112 to yield a purified produced gas 114 that is combusted in the gas turbine 116. Examples of gas separation methods at least partially removing carbon dioxide from the produced gas include, but are not limited to, a membrane filtration process, a cold fraction process, an extractive distillation, and the like, and any combination thereof (each described further herein). Examples of methods for at least partially removing hydrogen sulfide from produced gas 110 include, but are not limited to, hydrogen scavenging methods using liquids and/or high surface area materials (e.g., described in U.S. Pat. Nos. 5,128,049, 5,462,721, 6,136,282, 8,133,302, and 10,343,107 and U.S. Pat. App. Pub. No. 2015/0027056, each of which is incorporated herein by reference), and the like, and any combination thereof. Examples of methods for at least partially removing metal-containing compounds from produced gas 110 include, but are not limited to, adsorption by porous materials and/or polymeric membranes (e.g., described in in U.S. Pat. No. 5,463,167 and International Pat. App. Pub. No. WO/2013/142325, each of which is incorporated herein by reference), mercury scavenger solutions (e.g., described in U.S. Pat. No. 6,475,451, which is incorporated herein by reference), and the like, and any combination thereof.

Further, where the one or more purification units 112 are for removing carbon dioxide and/or nitrogen from the produced gas 110, the carbon dioxide and/or nitrogen can be used in the method 100 downstream to be combined with the carbon dioxide-enriched flue gas 126 before compression and injection.

The produced gas 110 may have a gas volume of about 1 MMSCFD or greater (or about 5 MMSCFD or greater, or about 10 MMSCFD or greater, or about 15 MMSCFD or greater, or about 20 MMSCFD or greater, or about 25 MMSCFD or greater, or about 30 MMSCFD or greater, or about 35 MMSCFD or greater, or about 40 MMSCFD or greater, or about 45 MMSCFD or greater, or about 50 MMSCFD or greater, or about 100 MMSCFD or greater, or about 150 MMSCFD or greater, or about 200 MMSCFD or greater, or about 250 MMSCFD or greater, or about 300 MMSCFD or greater, or about 350 MMSCFD or greater, or about 400 MMSCFD or greater, or about 450 MMSCFD or greater, or about 500 MMSCFD or greater). The produced gas 110 may have a gas volume of about 50 MMSCFD to about 500 MMSCFD (or about 60 MMSCFD to about 400 MMSCFD, or about 70 MMSCFD to about 300 MMSCFD, or about 80 MMSCFD to about 200 MMSCFD).

The gas turbine 116 may have a gas volume capacity of about 1 MMSCFD or greater (such as about 50 MMSCFD to about 500 MMSCFD). When the volume of the produced gas 110 is (a) greater than the capacity of the gas turbine 116 and/or (b) greater than needed to produce a desired amount of power 118, a portion 148 of the produced gas 110 may be diverted from upstream of the gas turbine 116 to be mixed with the carbon dioxide-enriched flue gas 126 before compression and injection.

Combusting a produced gas 110 (or purified produced gas 114) in a gas turbine 116 to produce power 118 and a flue gas 120 can be carried out in a gas-fired power generation unit, wherein an optimal combustion of the produced gas, in the presence of air, can be determined using the following equation:

wherein a=x+y/4 (Stoichiometric), and wherein $C_xH_y$ refers to hydrocarbon(s) or a hydrocarbyl group having "x" carbon atom(s) per molecule or group, wherein x is a positive integer (e.g., x can be 1, 2, 3, 4, 5, etc., such as x can be from 1 to 4), and "y" hydrogen atom(s) per molecule or group such as y=2x+2, wherein y is a positive integer.

Gas turbines may have fuel flexibility which allows the turbines to consume various fuels other than methane-majored natural gas. Specifically, in embodiments of the present disclosure, the gas turbine can consume low-BTU gases with high inerts (e.g., $CO_2$ and $N_2$), and/or Syngas (e.g., $H_2$ and CO, and $H_2S$). Accordingly, methods of the present disclosure enable the cost reduction of the gas separation process. Furthermore, methods of the present disclosure enable the gas turbines to operate at higher power output with similar efficiency compared with the same equipment firing pipeline quality natural gas. For instance, suitable examples of gas turbine for power generation of up to 50 megaWatts can be a heavy-duty gas turbine 9F (50 Hz) from GENERAL ELECTRIC POWER®, and/or 9E.03/.04 heavy-duty gas turbine from GENERAL ELECTRIC POWER®. Depending on the power generation capacity, a plurality of gas turbines may be employed and arranged based on the floater type (e.g., a semi-submersible or ship-shaped monohull structure).

The power 118 can be (a) consumed locally, (b) exported to nearby offshore facilities (e.g., exploration and/or production offshore facilities, also referred to herein as production platforms), or (c) exported to onshore markets. The power output of method 100 can vary from several megaWatts (MW) (which can be used locally) to gigaWatts (GW). For example, the power 118 can be from 500 MW to 3 GW.

The power 118 can be at high voltage alternative current (HVAC), at high voltage direct current (HVDC), or a combination of both. Preferably, for lower power capacity and shorter distance, power can be at HVAC. For higher power capacity and longer distance, HVDC is preferred. The power 118 can be exported from the offshore facility via battery ships and/or cables.

The flue gas 120 passes from the gas turbine 116 to the first gas separator 122 where at least partial removal of nitrogen from the flue gas 120 is carried out to produce the carbon dioxide-enriched flue gas 126 and the nitrogen-enriched flue gas 124. If needed, sea water may be used for cooling the flue gas 120 before separation.

Water is a product of the combustion process. The cooling of the flue gas 120 between the gas turbine 116 and gas separator 122 may condense from the flue gas 120 to produce liquid water (not illustrated). The water can be collected and injected with the compressed gas 130 into reservoir 102 as an additional EOR fluid.

$CO_2$ separation in the first gas separator 122 may comprise a separation process selected from a group consisting of: a membrane filtration process, a cold fraction process, an extractive distillation, and the like, and any combination thereof. These are described further herein.

The carbon dioxide-enriched flue gas 126 passes from the gas separator 122 to the gas compressor 128 where carbon dioxide-enriched flue gas 126 is compressed to produce a compressed gas 130. The gas compressor 128 may use the electricity generated from the onboard power plant produced by the gas turbine 116. The compressed gas 130 can be injected from the gas compressor 128 into the gas reservoir 102.

The compressed gas 130 can be injected into a porous and permeable gas reservoir 102 where the injected compressed gas 130 can serve to drive hydrocarbons in the reservoir towards a production well, thereby achieving enhanced gas recovery. Injecting both water and gas into the reservoir for EOR can also be referred to as a "Water-Alternating-Gas" (WAG) process.

A portion 132 of produced gas 110 (or purified produced gas 114) is diverted to the reformer 134. The reformer 134 converts the produced gas 104 (or purified produced gas 108) in the presence of water into hydrogen and carbon dioxide, illustrated as stream 136. The water can be purified from sea water and/or condensed water from the combustion process. The reformer 134 may be for steam reforming and include a downstream unit for water-gas-shift reaction. In FIG. 1 the reforming step is illustrated with a single box, but may include one or more reactors and multiple reactions. For example, the reactions may include, catalytic steam reforming followed by water-gas-shift reacting to yield stream 136 comprising hydrogen and carbon dioxide. The catalyst steam reforming can be conducted by methods and systems described in Liu, Ke; Song, Chunshan; Subramani, Velu, eds. (2009), pages 14-126, *Hydrogen and Syngas Production and Purification Technologies*, doi:10.1002/9780470561256, ISBN 9780470561256, which is incorporated herein by reference. The water-gas-shift reaction can be conducted by methods and systems described in *Catalyst Handbook* Second Edition (1996) Chapter 6, edited by Martyn V. Twigg, which is incorporated herein by reference.

The stream 136 can then be separated (e.g., using a membrane filtration process, a cold fraction process, an extractive distillation, and the like, and any combination thereof) in a second gas separator 138 into a hydrogen stream 142 and a carbon dioxide stream 140. The carbon dioxide stream 140 can be combined with the carbon dioxide-enriched flue gas 126 before compression. The hydrogen stream 142 and the nitrogen-enriched flue gas 124 can be reacted in the ammonia reactor 144 to yield the ammonia 146 via the Haber-Bosch Process or other ammonia production processes. The Haber-Bosch Process (ammonia production reaction) can be conducted by methods and systems described in *Appl, M*. (1982), The Haber-Bosch Process and the Development of Chemical Engineering: A Century of Chemical Engineering, pages 29-54, ISBN 978-0-306-40895-3, which is incorporated herein by reference.

Optionally, a portion 148 of the produced gas 110 (or purified produced gas 114) can be diverted and combined with the carbon dioxide-enriched flue gas 126 and carbon dioxide stream 140. The combination of the carbon dioxide-enriched flue gas 126, carbon dioxide stream 140, and optionally the portion 148 of the produced gas 110 (or purified produced gas 114) are compressed in gas compressor 128 to yield compressed gas 130. The compressed gas 130 is then injected into the reservoir 102.

The systems and methods described relative to FIG. 1 preferably relate to self-sustaining offshore facilities where about 80 mol % or more (or 90 mol % or more, or essentially all, or about 80 mol % to 100 mol %, or about 90 mol % to 100 mol %, or about 95 mol % to 100 mol %) of the hydrocarbon in the produced gas 110 is used in combusting, reforming, and (if stream 148 is included) a portion of the compressed gas 130. Therefore, the production from the offshore facility consist essentially of (or consists of) the produced oil 108, the power 118, the compressed gas 130, the ammonia 146, and any byproducts from the one or more purification units 112. Herein, a "hydrocarbon-derived export" from an offshore facility refers to a commodity containing hydrocarbon or derived from hydrocarbon in the produced gas that is transported from the offshore facility to another location for use. The hydrocarbon-derived exports from a self-sustaining offshore facility described in FIG. 1 consists essentially of (or consists of) the produced oil 108, the power 118, and the ammonia 146. Additionally, compressed gas 130 is produced by the processes herein for reuse in the overall system as an EOR fluid.

Therefore, a method of the present disclosure includes: providing an offshore facility comprising a gas turbine 116, a first gas separator 122, a reformer 134, a second gas separator 138, and an ammonia reactor 144; producing a produced hydrocarbon 104 from a gas reservoir 102 to the offshore facility; separating the produced hydrocarbon 104 to yield a produced gas 110 and a produced oil 108; combusting the produced gas 110 in a gas turbine 116 to produce power 118 and a flue gas 120; at least partially removing nitrogen from the flue gas 120 in the first gas separator 122 to produce a carbon dioxide-enriched flue gas 126 and a nitrogen-enriched flue gas 124; reforming a portion 132 of the produced gas 110 in the reformer 134 to produce a stream 136 comprising hydrogen and carbon dioxide; at least partially separating the carbon dioxide in the second gas separator 138 from the stream 136 to yield a carbon dioxide stream 140 and a hydrogen stream 142; reacting the hydrogen stream 142 and the nitrogen-enriched flue gas 124 in the ammonia reactor 144 to yield ammonia 146; combining and compressing the carbon dioxide stream 140 and the carbon dioxide-enriched flue gas 126 in a gas compressor 128 to produce a compressed gas 130; and injecting the compressed gas 130 from the gas compressor 128 into the gas reservoir 102, wherein 80 mol % or more (or 90 mol % or more, or essentially all) of hydrocarbon in the produced gas 110 is combusted, reformed, and/or injected into the gas reservoir 102.

Further, a system of the present disclosure includes: an offshore production unit configured for producing a produced hydrocarbon 104 from a reservoir 102; an oil and gas separator 106 to receive the produced hydrocarbon 104 for separating the produced hydrocarbon 104 into a produced gas 110 and a produced oil 108; a gas turbine 116 configured to receive the produced gas 110 for producing power 118 and a flue gas 120; a first gas separator 122 configured to receive the flue gas 120 for at least partially removing nitrogen from the flue gas 120 and for producing a carbon dioxide-enriched flue gas 126 and a nitrogen-enriched flue gas 124; a reformer 134 configured to receive a portion 132 of the produced gas 110 from upstream of the gas turbine 116 for producing a stream 136 comprising carbon dioxide and hydrogen; a second gas separator 138 configured to receive the stream 136 for at least partially removing carbon dioxide from the stream 136 and for producing a carbon dioxide stream 140 and a hydrogen stream 142; an ammonia reactor 144 configured to receive the hydrogen stream 142 and the nitrogen-enriched flue gas 124 for producing ammonia 146; a gas compressor 128 configured to receive the carbon dioxide-enriched flue gas 126 and the carbon dioxide stream 140 for producing a compressed gas 130; and an injection unit configured for injecting the compressed gas 130 from the gas compressor 128 into the gas reservoir 102.

FIG. 1 provides non-limiting examples and descriptions of methods and systems of the present disclosure. One skilled in the art will recognize other components that may be included for proper and safe operability of said methods. Examples of other components include, but are not limited to, flow meters, sensors, heat exchangers, valves, and the like, and any combination thereof.

The offshore facility on which the gas turbine, gas separator, gas compressor, and ammonia reactor reside may be a low motion floater selected from a group consisting of: a semi-submersible, a ship-shaped monohull, and the like, and any combination thereof. Thus, a relative low roll motion floater may be employed in order to host all gas processing and power generation facilities. The sizing and weight of topside facilities may be super-linear to the gas treating volumes. The super-linear relation means that once beyond a threshold, the increase of top facilities' weights and sizing due to the increase of gas throughput may be larger than the case when the total sizing and weights are below the threshold. Therefore, a large, stable floater may be used to serve as the platform for all processing facilities. For example, a lager bilge keel below the hull can help to provide a better stability for the floater. In terms of the size and width, a typical Very Large Crude Carrier (VLCC) type of vessel can serve as a base model, with the standard dimensions ranging between 300 meters to 330 meters in length, 58 meters breadth, and 31 meters in depth.

Semi-submersible can be a substantially stable and cost effective platform for offshore gas processing and power generation. Column-stabilized or Bottle-type semi-submersible can both be applicable for purposes of the present disclosure. Indeed, column-stabilized or bottle-type semi-submersible can offer exceptional stability for gas treating and power generation operations, thus reducing rolling and pitching from waves and wind. Semi-submersible can also be a suitable example as a low motion floater since it can handle harsh weather and the drastic ocean environment.

The ship-shaped monohull is a monohull type of flow power regeneration and $CO_2$ re-injection (FPGCR), which shares similarity with the floating production storage and offloading unit (FPSO), except that the storage function of the latter are removed and the gas handling and power generation modules are added. An FPSO consists of a large tanker type vessel moored to a seafloor. An FPSO is designed to process and stow production from nearby subsea wells and to periodically offload the stored compressed gas to a smaller shuttle tanker. The shuttle tanker then transports the compressed gas to an onshore facility for further processing. An FPSO may be suited for marginally economic fields located in remote deep-water areas where a pipeline infrastructure does not exist. The cargo space inside the monohull can fit power generation units and carbon capture facilities. The sizing of the monohull scales super-linearly with the gas treating volumes.

Alternative position-keeping configurations can be used for the semi-submersible and the ship-shaped monohull floaters, such as Dynamic Positioning (DP). It allows faster deployment and mobility than a traditional mooring line type of approach. DP can easily use the generated power, thus making itself more attractive. Moreover, no anchor handling tugs are required. Also, DP is water depth and seabed insensitive.

Methods for offshore power generation and $CO_2$ injection according to the present disclosure may further comprise: controlling a position of the low motion floater by a computer-controlled system.

The offshore facility may comprise one or more gas turbines configured to provide the power to one or more FPSOs within operating range. The offshore facility may be a fixed platform, a floating system on a sea surface, a suspended system in a water column or sit on a seabed, or a combination thereof. The offshore facility may be a low motion floater, such as a semi-submersible, or a ship-shaped monohull.

A computer-controlled system may be configured for controlling a position of the low motion floater. The computer-controlled system can receive the power from the gas turbine. Herein, the gas turbine may use sea water for cooling flue gas.

Consequently, methods and apparatus of the present disclosure can successfully facilitate an enhanced hydrocarbon recovery.

The power can be stored, consumed either on board or by nearby subsea equipment, transmitted via cables to onshore gird or transported by battery ship, or a combination thereof. Furthermore, the power may be provided at high voltage alternative current (HVAC), at high voltage direct current (HVDC), or a combination thereof.

Figure 2:
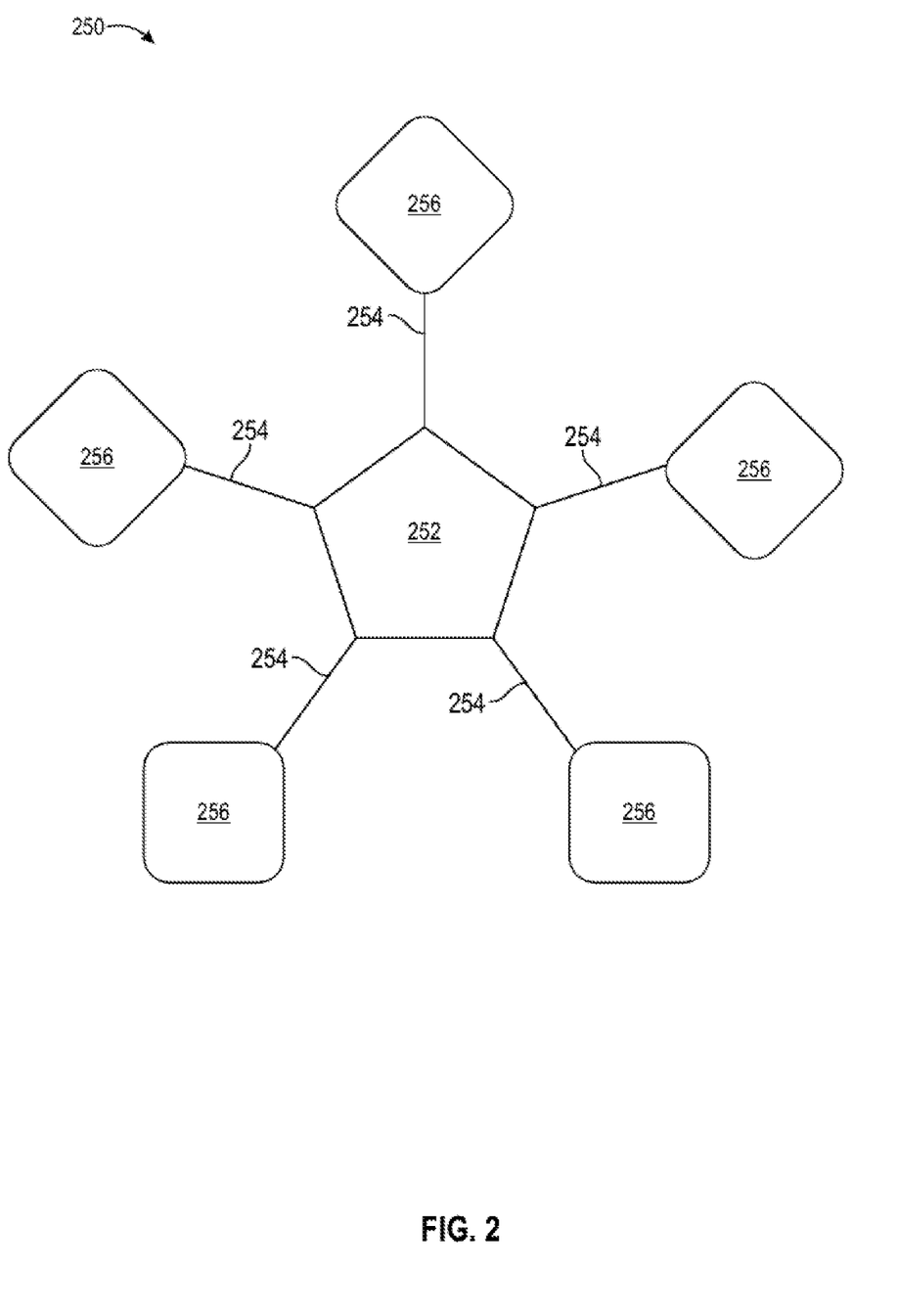
FIG. 2 is a flow diagram of an integrated field development enabled by the power generation and $CO_2$ injection.

FIG. 2 is a flow diagram of an integrated field development 250 enabled by the power generation and $CO_2$ injection. A centralized power generation unit 252 (e.g., described relative to FIG. 1) can provide power 254 to nearby floating production storage and offloading unit(s) (FPSOs) 256 within the operating range. In this way, the power generation modules on each FPSO 256 can be removed (or reduced in size), giving more space to gas production and compression equipment. Furthermore, the said integrated field development 250 may enhance each FPSO's production throughput by providing a significantly larger amount of power 254 usually confined by the limited space and weight on board. Thus, the power 254 can be provided to one or more production platforms within operating range, wherein the one or more production platforms may be floating structures (e.g., FPSO 256). The power 254 may be provided at high voltage alternative current (HVAC), at high voltage direct current (HVDC), or a combination thereof.

$CO_2$ Separation Methods and Systems

Herein, the $CO_2$ separation may comprise a separation process selected from a group consisting of: a membrane filtration process, a cold fraction process, an extractive distillation, and the like, and any combination thereof. The selection of $CO_2$ removal process may depend on the gas volume, composition and pressures.

For example, separation using a membrane filtration process relates to gas treating membrane systems providing a safe and efficient option for $CO_2$ removal from natural gas, especially in remote areas. The separation is based on gas permeation speed (diffusivity and solubility), wherein the driving force is based on a partial pressure difference. For example, the residue gas (hydrocarbons) can stay in the high pressure residue gas stream. Membrane systems can be extremely adaptable to gas volume, $CO_2$ concentration, and feed gas specifications. Such separation process is preferred over other available technologies when the operating pressure is over 450 psig, the electricity is abundant, and the space and weight is confined like in the offshore environment. The separation process may be based on gas permeation speed, also known as selective permeation. Components with higher permeation rates (such as $CO_2$, $H_2$, and $H_2S$) may permeate with a faster speed through the membrane system than other components with lower permeation rates (such as $N_2$, methane, ethane and heavier hydrocarbons. Thus, in the case of $CO_2$ removal from the produced gas, a feed gas can be separated into a methane-enriched (residual) stream on the exterior of the membrane fiber and a carbon dioxide-enriched (permeate) stream on the interior of the membrane fiber. In the case of $CO_2$ removal from the flue gas, a flue gas can be separated into a $CO_2$-enriched stream and a nitrogen-enriched stream. The primary driving force of the separation can be the partial pressure difference of the permeating component. Therefore, the pressure difference between the feed gas and permeate gas and the concentration of the permeating component can determine the product purity and the amount of carbon dioxide membrane surface required. A higher differential pressure will require a smaller membrane. For instance, bulk removal process exists for onshore and offshore applications, with capacity of feed gas up to 700 MMSCFD. The membrane system can process feed gas with 3% to 90% $CO_2$ and generate residual gas with 2% to 80% $CO_2$. A single or a plurality of guard beds may be employed in case of the presence of sulfur and heavy metals like mercury. Non-limiting examples of membranes for $CO_2$ separation may include: CYNARA® (an acid gas membrane system used for $CO_2$ and $H_2S$ removal; available from Schlumberger™), APURA® (designed for use in high-pressure, medium- to low-$CO_2$ applications for bulk and fine removal of components such as water, $CO_2$, and $H_2S$; available from Schlumberger™), UOP SEPAREX™ membrane (available from Honeywell UOP™), MEDAL™ membrane (available from Air Liquide™), and PEEK™ membrane (available from Air Liquide™).

Furthermore, the separation of $CO_2$ from the flue gas may be performed using a cold fractionation process that deals with $CO_2$ freezing in a special section of the distillation column, known as CONTROLLED FREEZE ZONE™ (also referred to as "CFZ"; available from ExxonMobil™).

Furthermore, the separation of $CO_2$ from the flue gas may be performed using a cold distillation technology wherein a hydrocarbon solvent can be used to suppress $CO_2$ freezing, known as the "Extractive Distillation" (available from Chart Industries™).

Methods for offshore power generation and $CO_2$ injection according to the present disclosure may further comprise: diverting a portion of the produced gas from upstream of the gas turbine to downstream of the gas separator.

A first non-limiting example embodiment of the present disclosure is a method comprising: providing an offshore facility comprising a gas turbine, a first gas separator, a reformer, a second gas separator, and an ammonia reactor; producing a produced hydrocarbon from a gas reservoir to the offshore facility; separating the produced hydrocarbon to yield a produced gas and a produced oil; combusting the produced gas in a gas turbine to produce power and a flue gas; at least partially removing nitrogen from the flue gas in the first gas separator to produce a carbon dioxide-enriched flue gas and a nitrogen-enriched flue gas; reforming a portion of the produced gas in the reformer to produce a stream comprising hydrogen and carbon dioxide; at least partially separating the carbon dioxide in the second gas separator from the stream to yield a carbon dioxide stream and a hydrogen stream; reacting the hydrogen stream and the nitrogen-enriched flue gas in the ammonia reactor to yield ammonia; combining and compressing the carbon dioxide stream and the carbon dioxide-enriched flue gas in a gas compressor to produce a compressed gas; and injecting the compressed gas from the gas compressor into the gas reservoir, wherein 80 mol % or more of hydrocarbon in the produced gas is combusted, reformed, and/or injected into the gas reservoir. The first non-limiting example embodiment may further include one or more of: Element 1: wherein hydrocarbon-derived exports from the offshore facility consists essentially of the produced oil, the power, and the ammonia; Element 2: the method further comprising: purifying the produced gas upstream of the gas turbine to at least partially remove one or more of: carbon dioxide, nitrogen, a heavy metal, and hydrogen sulfide; Element 3: Element 2 and wherein the purifying at least partially removes carbon dioxide, and wherein the method further comprises: combining the carbon dioxide with the carbon dioxide-enriched flue gas and the carbon dioxide stream before compressing the carbon dioxide-enriched flue gas; Element 4: the method further comprising: diverting a portion of the produced gas upstream of the gas turbine; and adding the portion of the produced gas to the carbon dioxide-enriched flue gas before compressing the carbon dioxide-enriched flue gas; Element 5: wherein the produced gas comprises a gas selected from the group consisting of: steam, hydrogen, helium, nitrogen, carbon monoxide, carbon dioxide, hydrogen sulfide, one or more $C_1$-$C_4$ hydrocarbons, metal-containing compounds, and any combination thereof; Element 6: Element 5 and wherein the produced gas comprises a combined carbon dioxide and nitrogen content of about 25 mol % or greater; Element 7: wherein the produced gas has a gas volume of about 1 MMSCFD or greater; Element 8: wherein the produced gas has a gas volume of about 50 MMSCFD to about 500 MMSCFD; Element 9: the method further comprising: condensing a water vapor from the flue gas to produce a liquid water; and injecting the liquid water with the compressed gas into the gas reservoir; Element 10: wherein the power is from 500 megawatts (MW) to 3 gigawatts (GW); Element 11: wherein the power is stored, consumed either on board or by nearby subsea equipment, transmitted via cables to onshore grid or transported by battery ship, or a combination thereof; Element 12: the method further comprising: providing the power to one or more production platforms within operating range, wherein the one or more production platforms are floating structures; Element 13: Element 12 and wherein the power is comprised of a high voltage alternative current (HVAC), a high voltage direct current (HVDC), or a combination thereof; Element 14: wherein the offshore facility is a low motion floater selected from a group consisting of: a semi-submersible, a ship-shaped monohull, and a combination thereof; Element 15: Element 14 and the method further comprising: controlling a position of the low motion floater by a computer-controlled system; and Element 16: the method further comprising: cooling the flue gas with sea water. Examples of combinations include, but are not limited to, Element 1 in combination with one or more of Elements 2-16; Element 2 (optionally in combination with Element 3) in combination with one or more of Elements 4-16; Element 4 in combination with one or more of Elements 5-16; Element 5 (optionally in combination with Element 6) in combination with one or more of Elements 7-16; Element 7 or Element 8 in combination with one or more of Elements 9-16; Element 9 in combination with one or more of Elements 10-16; Element 10 in combination with one or more of Elements 11-16; Element 11 in combination with one or more of Elements 12-16; Element 12 (optionally in combination with Element 13) in combination with one or more of Elements 14-16; and Element 14 (optionally in combination with Element 15) in combination with Element 16.

A second non-limiting example embodiment is an offshore facility comprising: an offshore production unit configured for producing a produced hydrocarbon from a reservoir; an oil and gas separator to receive the produced hydrocarbon for separating the produced hydrocarbon into a produced gas and a produced oil; a gas turbine configured to receive the produced gas for producing power and a flue gas; a first gas separator configured to receive the flue gas for at least partially removing nitrogen from the flue gas and for producing a carbon dioxide-enriched flue gas and a nitrogen-enriched flue gas; a reformer configured to receive a portion of the produced gas from upstream of the gas turbine for producing a stream comprising carbon dioxide and hydrogen; a second gas separator configured to receive the stream for at least partially removing carbon dioxide from the stream and for producing a carbon dioxide stream and a hydrogen stream; an ammonia reactor configured to receive the hydrogen stream and the nitrogen-enriched flue gas for producing ammonia; a gas compressor configured to receive the carbon dioxide-enriched flue gas and the carbon dioxide stream for producing a compressed gas; and an injection unit configured for injecting the compressed gas from the gas compressor into the gas reservoir. The second non-limiting example embodiment may further include one or more of: Element 17: wherein hydrocarbon-derived exports from the offshore facility consists essentially of the produced oil, the power, and the ammonia; Element 18: the system further comprising: one or more purification units configured to receive the produced gas upstream of the gas turbine to at least partially remove one or more of: carbon dioxide, nitrogen, a heavy metal, and hydrogen sulfide; Element 19: Element 18 and wherein the one or more purification units at least partially removes carbon dioxide, and wherein the system further comprises: lines configured for combining the carbon dioxide with the carbon dioxide-enriched flue gas and the carbon dioxide stream before compressing the carbon dioxide-enriched flue gas; Element 20: the system further comprising: a line configured for diverting a portion of the produced gas upstream of the gas turbine and adding the portion of the produced gas to the carbon dioxide-enriched flue gas before compressing the carbon dioxide-enriched flue gas; Element 21: the system further comprising: one or more units configured for condensing a water vapor from the flue gas to produce a liquid water; Element 22: the system further comprising: units (e.g., batteries, fuel cells, power lines, and the like) configure for (a) the storing and/or consuming the power either on board and/or (b) transmitting (e.g., via lines or battery ships) the power to nearby subsea equipment, one or more production platforms, and/or an onshore grid; Element 23: wherein the offshore facility is a low motion floater selected from a group consisting of: a semi-submersible, a ship-shaped monohull, and a combination thereof; Element 24: Element 23 and the system further comprising: a computer-controlled system configured for controlling a position of the low motion floater; and Element 25: the system further comprising: a unit configured for cooling the flue gas with sea water. Examples of combinations include, but are not limited to, Element 17 in combination with one or more of Elements 18-25; Element 18 (optionally in combination with Element 19) in combination with one or more of Elements 20-25; Element 20 in combination with one or more of Elements 21-25; Element 21 (optionally in combination with Element 22) in combination with one or more of Elements 23-25; and Element 23 (optionally in combination with Element 24) in combination with Element 25.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Whenever a numerical range with a lower limit and an upper limit is disclosed, any number and any included range falling within the range is specifically disclosed, including the lower limit and upper limit. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to one having ordinary skill in the art and having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein.

What is claimed is:
1. A method comprising:
providing an offshore facility comprising a gas turbine, a first gas separator, a reformer, a second gas separator, and an ammonia reactor;
producing a produced hydrocarbon from a gas reservoir to the offshore facility;
separating the produced hydrocarbon to yield a produced gas and a produced oil;
combusting the produced gas in a gas turbine to produce power and a flue gas;
at least partially removing nitrogen from the flue gas in the first gas separator to produce a carbon dioxide-enriched flue gas and a nitrogen-enriched flue gas;
reforming a portion of the produced gas in the reformer to produce a stream comprising hydrogen and carbon dioxide;
at least partially separating the carbon dioxide in the second gas separator from the stream to yield a carbon dioxide stream and a hydrogen stream;
reacting the hydrogen stream and the nitrogen-enriched flue gas in the ammonia reactor to yield ammonia;
combining and compressing the carbon dioxide stream and the carbon dioxide-enriched flue gas in a gas compressor to produce a compressed gas; and
injecting the compressed gas from the gas compressor into the gas reservoir, wherein 80 mol % or more of hydrocarbon in the produced gas is combusted, reformed, and/or injected into the gas reservoir.

2. The method of claim 1, wherein hydrocarbon-derived exports from the offshore facility consists essentially of the produced oil, the power, and the ammonia.

3. The method of claim 1, further comprising:
purifying the produced gas upstream of the gas turbine to at least partially remove one or more of: carbon dioxide, nitrogen, a heavy metal, and hydrogen sulfide.

4. The method of claim 3, wherein the purifying at least partially removes carbon dioxide, and wherein the method further comprises:
combining the carbon dioxide with the carbon dioxide-enriched flue gas and the carbon dioxide stream before compressing the carbon dioxide-enriched flue gas.

5. The method of claim 1, further comprising:
diverting a portion of the produced gas upstream of the gas turbine; and
adding the portion of the produced gas to the carbon dioxide-enriched flue gas before compressing the carbon dioxide-enriched flue gas.

6. The method of claim 1, wherein the produced gas comprises a gas selected from the group consisting of: steam, hydrogen, helium, nitrogen, carbon monoxide, carbon dioxide, hydrogen sulfide, one or more $C_1$-$C_4$ hydrocarbons, metal-containing compounds, and any combination thereof.

7. The method of claim 6, wherein the produced gas comprises a combined carbon dioxide and nitrogen content of about 25 mol % or greater.

8. The method of claim 1, wherein the produced gas has a gas volume of about 1 million standard cubic feet per day (MMSCFD) or greater.

9. The method of claim 1, wherein the produced gas has a gas volume of about 50 MMSCFD to about 500 MMSCFD.

10. The method of claim 1, further comprising:
condensing a water vapor from the flue gas to produce a liquid water; and
injecting the liquid water with the compressed gas into the gas reservoir.

11. The method of claim 1, wherein the power is from 500 megawatts (MW) to 3 gigawatts (GW).

12. The method of claim 1, wherein the power is stored, consumed either on board or by nearby subsea equipment, transmitted via cables to onshore grid or transported by battery ship, or a combination thereof.

13. The method of claim 1, further comprising:
providing the power to one or more production platforms within operating range, wherein the one or more production platforms are floating structures.

14. The method of claim 13, wherein the power is comprised of a high voltage alternative current (HVAC), a high voltage direct current (HVDC), or a combination thereof.

15. The method of claim 1, wherein the offshore facility is a low motion floater selected from a group consisting of a semi-submersible, a ship-shaped monohull, and a combination thereof.

16. The method of claim 15 further comprising:
controlling a position of the low motion floater by a computer-controlled system.

17. The method of claim 1, further comprising:
cooling the flue gas with sea water.

18. An offshore facility comprising:
an offshore production unit configured for producing a produced hydrocarbon from a gas reservoir;
an oil and gas separator to receive the produced hydrocarbon for separating the produced hydrocarbon into a produced gas and a produced oil;
a gas turbine configured to receive the produced gas for producing power and a flue gas;
a first gas separator configured to receive the flue gas for at least partially removing nitrogen from the flue gas and for producing a carbon dioxide-enriched flue gas and a nitrogen-enriched flue gas;
a reformer configured to receive a portion of the produced gas from upstream of the gas turbine for producing a stream comprising carbon dioxide and hydrogen;
a second gas separator configured to receive the stream for at least partially removing carbon dioxide from the stream and for producing a carbon dioxide stream and a hydrogen stream;
an ammonia reactor configured to receive the hydrogen stream and the nitrogen-enriched flue gas for producing ammonia;
a gas compressor configured to receive the carbon dioxide-enriched flue gas and the carbon dioxide stream for producing a compressed gas; and
an injection unit configured for injecting the compressed gas from the gas compressor into the gas reservoir.

* * * * *